Jan. 1, 1924

A. L. SMITH

PASTEURIZER

Filed June 20, 1922

Inventor,
Arthur L. Smith
By
Atty.

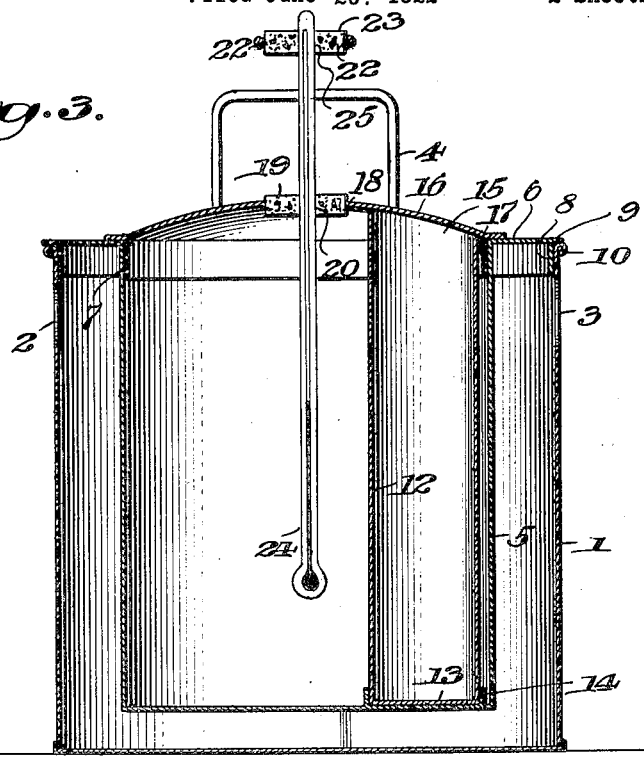
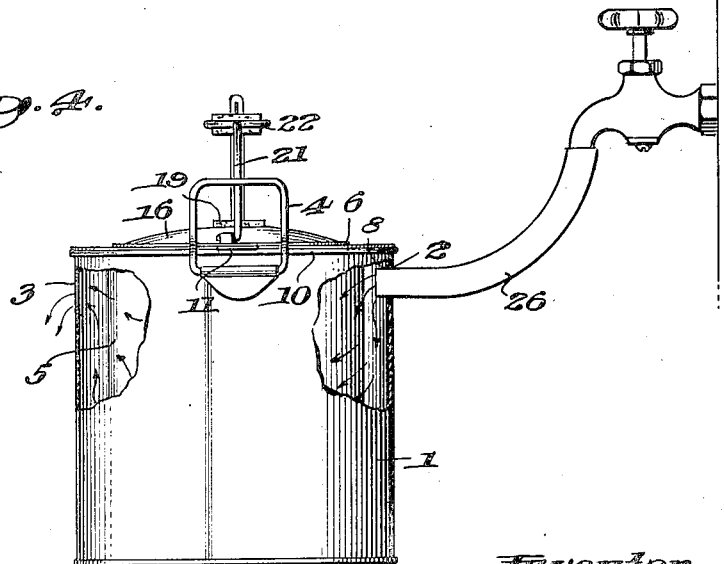

Patented Jan. 1, 1924.

1,479,750

UNITED STATES PATENT OFFICE.

ARTHUR L. SMITH, OF MECHANICVILLE, NEW YORK.

PASTEURIZER.

Application filed June 20, 1922. Serial No. 569,625.

*To all whom it may concern:*

Be it known that I, ARTHUR L. SMITH, a citizen of the United States, residing at Mechanicville, in the county of Saratoga and State of New York, have invented certain new and useful Improvements in Pasteurizers, of which the following is a specification.

This invention relates to milk and cream pasteurizers, and is particularly intended for domestic use.

In large cities pasteurized milk and cream can be purchased, if desired, but in smaller cities, towns, and country districts, pasteurized milk and cream are, ordinarily, unobtainable.

It is a matter of common knowledge that tuberculosis, particularly in very young children, is largely contracted from milk coming from tubercular cows and in smaller cities, towns, and country districts this danger is not guarded against.

Recognizing the need for a simple, inexpensive, durable and efficient pasteurizer for milk and cream, it is the object of my invention to provide an appliance of that character which will embody improvements particularly adapting it for family use so that milk and cream, or either of them, may be conveniently pasteurized in the kitchen or other suitable part of the domestic establishment where a gas, coal, or electric heater and running water are available, to the end that the daily supply of milk and cream, or either of them may be treated and rendered safe for consumption.

My pasteurizer embodies an outer can or receptacle for containing the water and through which water may be circulated, and an inner container or receptacle for the milk, there being provided a removable container or receptacle for the cream, the milk container being combined in an improved manner with the tank, a removable cover for closing the milk and cream receptacles, and a thermometer adjustably supported by the cover in an improved fashion.

The invention also comprises the particular means by which the cooling water may be introduced into the tank and, after circulation through it, made to issue therefrom; the combination of the milk receptacle or container and the removable cream container located inside the milk container; the particular means for adjustably supporting the thermometer and its relationship to the cover; and the relationship of water tank, milk container, and cover all supported by the water tank.

My invention not only differs from pasteurizing or sterilizing apparatus which has preceded it in regard to the construction and combination of the different parts but, it will be understood, that such construction and relationship particularly adapts the invention for embodiment in a pasteurizer of a form and size which finds particular usefulness in the household, as distinguished from pasteuring apparatus intended to treat milk and cream in large volume in dairies and other places where milk and cream are made ready for marketing on a large scale.

In the accompanying drawings:

Fig. 3 is a vertical section through the complete, assembled pasteurizer; and

Fig. 4 is a side elevation, partly broken away, showing how the pasteurizer is connected to a cold water faucet.

Figure 1:
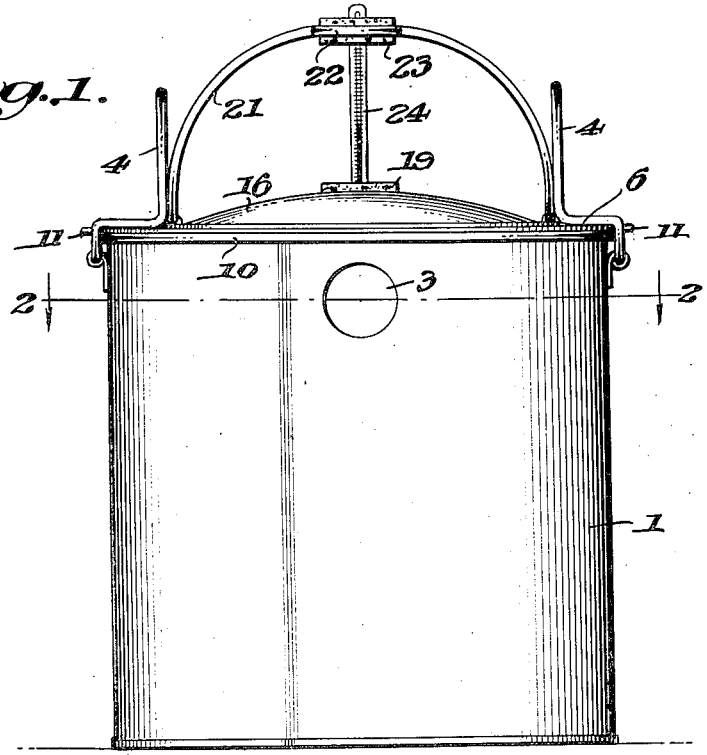
Figure 1 is a side elevation of the complete pasteurizer in assembled condition.
Figure 2:
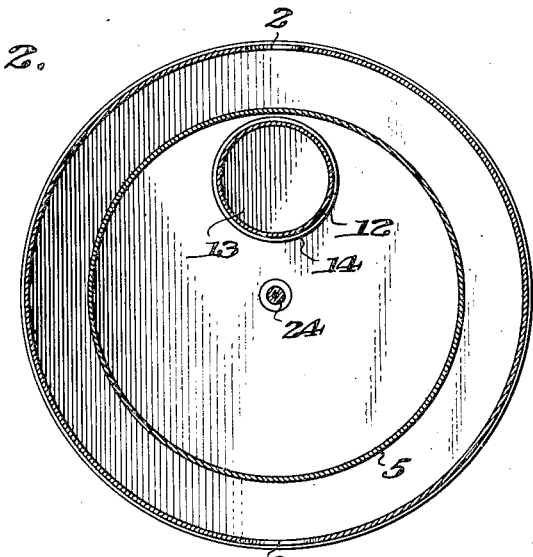
Fig. 2 is a section on the line 2—2, Fig. 1.

The receptacle or tank for containing the water appears at 1 and may be of any suitable metal such as tin or aluminum. This tank is provided with openings 2 and 3 near its upper edge, the former being smaller and for the admission of cooling water as will be hereinafter described, and the latter is larger and serves as an overflow and also an educt.

The tank 1 is provided with clamping hinged bail-handles 4 which enable the tank to be conveniently carried about and also serve to clamp the flange of the milk receptacle.

The milk receptacle 5 will be of tin, aluminum or other suitable metal and is provided with an annular flange 6 surrounding its open top 7. Depending from the flange 6 is an annular rim 8 which is of a diameter adapting it to snugly fit inside of the open mouth 9 of the tank 1. The flange 6 extends beyond the rim 8 and rests upon the beaded edge 10 of the tank 1. Finger-holds 11 are provided on the flange 6 to enable the milk receptacle 5 to be conveniently placed inside of the tank 1 or removed therefrom.

The milk receptacle 5 is of somewhat smaller size or diameter than the water tank 1 and is of less height than said tank so that, when it is in position in the tank, it depends therein and is separated at its sides and bottom from the walls of the tank so that the milk receptacle is completely surrounded, except at its top, by the water in the tank 1. The flange 6 and rim 8 and that part of flange 6 beyond rim 8 seal the joint between the milk receptacle 5 and the tank 1 so that the water in the tank is prevented from escaping into the milk receptacle.

To enable cream to be pasteurized simultaneously with the pasteurization of the milk, if desired, there is provided a removable cream receptacle 12 of tubular form which has a closed bottom 13 removably fitting in a seat 14 carried by the bottom of the milk receptacle 5. The upper end of the cream receptacle 12 is open as at 15 for convenient filling. If cream is not used by the family employing the device, the cream receptacle or tube 12 may be removed. The detachable connection of the cream tube or receptacle 12 enables it to be separately filled and then placed in its seat and to be removed and set aside in a cooling chamber or refrigerator and its combination with the milk receptacle 5 enables cream and milk to be simultaneously pasteurized, thus obviating the necessity of separate treatments for milk and cream.

A cover 16 which is provided with a depending flange 17 adapted to snugly fit into the open mouth 7 of the milk receptacle 5, is adapted to close the milk and cream receptacles and seal them during the pasteurizing operation, the upper end of receptacle 12 fitting tightly against the cover. The cover 16 is provided with a central opening 18 in which is a removable stopper, preferably a cork, 19, having a hole 20 extending therethrough.

The cover 16 carries an arched thermometer holder 21 which may be of any suitable form and which has an opening 22 in which is fitted a plug 23, preferably a cork. The holder 21 may be a wire suitably connected to the cover 16 and provided with a coil at 22 but it is to be understood that I do not limit the holder 21 to the form shown as it might be of sheet metal.

A thermometer 24 extends through the hole 20 and a hole 25 in the plug 23, said thermometer being frictionally held by the plug 23 and the stopper 19 and it is adapted for adjustment up and down through the holes 20 and 25 to obtain a correct reading when the pasteurization of the milk is proceeding and to ascertain when the milk is ready to be removed from the pasteurizer and placed in the refrigerator or cooling chamber.

To enable the cooling water to be introduced into the water tank 1 for the purpose of forcing out the hot water and effecting the quick cooling of the milk and cream which is essential to sucessful pasteurization, there is provided a rubber tube 26 which is of a size adapting it to be introduced into the smaller opening 2 and to enable it to be slipped over a cold water faucet as shown in Fig. 4.

To use the appliance for pasteurizing milk or cream or both, the receptacle 1 is filled to a suitable level with water. The milk and cream to be pasteurized are poured into their containers 5 and 12, respectively, and the receptacle 5 is then introduced into the water in the tank 1 and pressed down until the rim 8 and flange 6 are in position against the mouth of the tank 1. This operation will cause the surplus water in the tank 1 to pass out through the outlet hole 3. The cover 16 is now placed upon the receptacle 5 to close the latter. The thermometer will now be immersed in the milk.

The handle clamps 4 are clamped on the flange 6 and the complete device is lifted onto a suitable gas, electric, or coal heater and allowed to remain until the thermometer registers 140°. When this temperature is reached the heat is cut off and the device allowed to stand for twenty minutes during which period the thermometer will rise to 150° or higher, thus assuring complete and safe pasteurization. At the expiration of the twenty minute period, the pasteurizer is set in the sink or other suitable place and the rubber tube 26 is inserted into the opening 2 and connected to the cold water faucet. Cold water is slowly admitted into the tube 26 and flows into the tank 1 and out through the larger opening 3, displacing the water in the tank and when the temperature of the milk has been brought down by this operation to about 60° as shown by the thermometer, the flow of cool water can be discontinued, the cover 16 removed, and the milk and cream poured into separate containers and placed in a cooling chamber or refrigerator.

By having the cream receptacle located in offset relation to the center of the milk receptacle and the thermometer 24 disposed centrally of milk receptacle 5, the heat from the water jacket is diffused more equally.

The upper end of the cream receptacle 12 is shaped to fit tightly against the under side of cover 16 which not only seals the receptacle 12 but also prevents it from tipping over during any part of the pasteurizing process.

I claim:

1. In a pasteurizer, the combination of an outer water receptacle, a detachable inner receptacle adapted for holding milk, and a smaller removable cream receptacle contained within the milk receptacle.

2. In a pasteurizer, the combination of an outer water receptacle, a detachable inner receptacle adapted for holding milk and provided on its bottom with a holder, and a cream receptacle removably seated in said holder.

3. In a pasteurizer, the combination with an outer water open-topped receptacle, of an open-topped detachable milk receptacle of smaller size than said water receptacle which is provided with a flange and a rim fitting the mouth of the water receptacle, a cream receptacle detachably carried by the milk receptacle, said milk and cream receptacles being suspended as a unit within the water receptacle by the flange and rim aforesaid, and a single detachable cover serving for the milk and cream receptacles.

4. In a pasteurizer, the combination of an outer water receptacle, an open-topped detachable inner milk receptacle having a separate cream holder, a single cover for the milk and cream receptacles, and a thermometer carried by, and extending downwardly through, said cover, said thermometer thereby being adapted to indicate the temperature prevailing in both the milk and cream.

5. In a pasteurizer, the combination of an outer water receptacle, an open-topped detachable inner milk receptacle, an open-topped cream receptacle located inside the milk receptacle and supported by it, and a cover for the milk and cream receptacles which bears against the open tops of both receptacles.

In testimony whereof I affix my signature.

ARTHUR L. SMITH.